United States Patent [19]

Reick

[11] 4,059,018
[45] Nov. 22, 1977

[54] DIRECT-ACTING LOW PRESSURE SENSOR

[75] Inventor: Franklin G. Reick, Westwood, N.J.

[73] Assignee: Michael Ebert, Mamaroneck, N.Y.; a part interest

[21] Appl. No.: 739,314

[22] Filed: Nov. 5, 1976

[51] Int. Cl.² ............................................. G01L 7/04
[52] U.S. Cl. ..................................................... 73/418
[58] Field of Search ........................... 73/418, 411, 412

[56] References Cited

U.S. PATENT DOCUMENTS

| 3,603,153 | 9/1971 | Schmaus ................................. 73/411 |
| 3,732,733 | 5/1973 | Schmaus et al. ....................... 73/411 |
| 3,986,400 | 10/1976 | Schmaus ................................. 73/418 |

Primary Examiner—Donald O. Woodiel

[57] ABSTRACT

A direct-acting pressure sensor of the elastic type capable of operating effectively in a very low pressure range. The sensor includes a flexible bladder of non-metallic material anchored at one end to a fluid input socket which communicates with the internal chamber of the bladder, the closed end of the bladder having an eyelet therein through which extends a spring wire. One end of the wire terminates at the socket while the free end thereof functions as a scale pointer. When fluid is fed to the bladder through the input socket, the bladder, which in the absence of pressure is coiled to assume a C-shaped configuration, is caused to uncoil to an extent determined by the applied pressure. The wire engaged by the uncoiling bladder is caused to deflect to provide a scale reading indicative of pressure.

10 Claims, 7 Drawing Figures

DIRECT-ACTING LOW PRESSURE SENSOR

BACKGROUND OF INVENTION

This invention relates generally to direct-acting pressure sensors, and more particularly to a pressure gauge of the elastic type which is operable in the very low-pressure range.

Measurement of absolute pressure, gauge pressure, vacuum and draft pressures, and differential pressure, is carried out by two primary types of pressure-sensitive elements, the first being the liquid column in which the height and density of the liquid are utilized to measure pressure, and the second being the elastic pressure device. The sole concern of the present invention is with elastic pressure elements which are designed to follow the physical law that within the elastic limit, stress is proportional to strain; hence deflection is proportional to applied pressure.

The Bourdon tube, because of its stability, simplicity and high pointer torque, is widely used as a pressure or vacuum indicator or controller. The operation of the Bourden tube is based on the principle that an elastic tube having an internal cross-section that is not a perfect circle, if bent or distorted, has the property of changing its shape with internal pressure variations. This internal pressure causes the cross-sectional form to become more circular, giving rise to a motion of the closed end of the tube if the open end is rigidly fixed. This motion is called "tip travel."

The Bourden tube comes in three main types. The C-type is formed by winding the tube to define a segment of a circle, whereas the spiral type is created by winding more than one turn of the tube in the shape of a spiral about a common axis. The helical type is created by winding several turns of the tube in the shape of a helix. A Bourdon spring in any of the existing types can be made from any metal or alloy which exhibits satisfactory elastic qualities.

While Bourdon tubes are capable of operating within various pressure ranges running as high as 100,000 psi, in no instance is it possible as a practical matter, to operate such tubes below 12 or 15 psi. Hence, despite the advantages of Bourden tubes, they are not effective as gauges in the low-pressure range and it has heretofore been necessary to employ costly and relatively fragile bellows or diaphragm-sensing elements to effect measurement in this range.

My prior U.S. Pat. No. 3,732,733 (Reick and Schmaus) discloses a low-cost pressure sensor capable of accurately gauging pressures in the low pressure range. The sensor disclosed in this patent includes two curved flat metal springs in a concentric arrangement wherein the springs are cantilevered from a socket, the free end of the springs being joined together at a tip from which a pointer extends. The springs enclose a flexible bladder having an internal chamber which communicates with the socket, whereby fluid fed through the socket into this chamber acts to expand the bladder and causes the springs to uncurl, thereby moving the tip and the pointer attached thereto as a function of the applied pressure.

In a conventional Bourden tube pressure gauge, the relationship between applied fluid pressure and tip travel is such that it takes a large pressure change to effect a relatively small tip movement. Consequently, commercial forms of such gauges include gear works or linkages to mechanically amplify the tip travel. The friction introduced by mechanical amplifiers usually makes it necessary to tap the gauge to cause it to register. Such tapping is unnecessary with a sensor of the type disclosed in my prior patent, for no mechanical amplifier is involved. The sensor is highly sensitive so that a small change in applied pressure produces a relatively large tip excursion.

Moreover, with this patented sensor, since there are no gears or linkages and the tip is directly coupled to the pointer, there is no problem of wear and the sensor has a high shock resistance as well as a long life expectancy.

While a sensor of the type disclosed in my prior patent is capable of measuring fluid pressures below 12 or 15 psi in a range in which a conventional Bourdon tube is unresponsive, because the bladder is loaded by two curved, flat metal springs, my patented sensor is insensitive to very low pressures in the range below 350 mm Hg (one atmosphere = 760 mm Hg). Moreover, curved metal springs of the type disclosed in my prior patent are relatively difficult and costly to manufacture.

The need for sensors or gauges operating in the very low pressure range is widespread, and while such sensor exists, they are relatively complex and costly.

SUMMARY OF THE INVENTION

In view of the foregoing, it is the main object of this invention to provide a direct-acting pressure sensor of the elastic type which is capable of operating effectively in a very low pressure range.

More particularly, an object of this invention is to provide a simple, stable and reliable pressure sensor which may be manufactured at exceptionally low cost, the sensor being responsive to low-level pressures to carry out indicating and/or control functions.

Briefly stated, these objects are attained in a pressure sensor in accordance with the invention wherein a flexible bladder of non-metallic material is anchored at one end to a fluid input socket which communicates with the internal chamber of the bladder, the closed end of the bladder having an eyelet therein through which there is extended a spring wire.

One end of the wire terminates at the socket while the free end thereof functions as a scale pointer, the wire normally pointing to the zero end of the scale. When fluid is fed to the bladder through the input socket, the bladder, which in the absence of pressure is coiled to assume a C-shaped configuration, is caused to uncoil to an extent determined by the applied pressure, the wire engaged by the uncoiling bladder being caused to deflect to provide a scale reading indicative of this pressure.

OUTLINE OF THE DRAWINGS

For a better understanding of the invention as well as other objects and further features thereof, reference is made to the following detailed description to be read in conjunction with the accompanying drawings, wherein.

Figure 4:
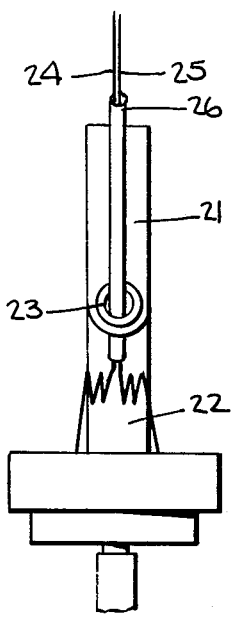
Figure 3:
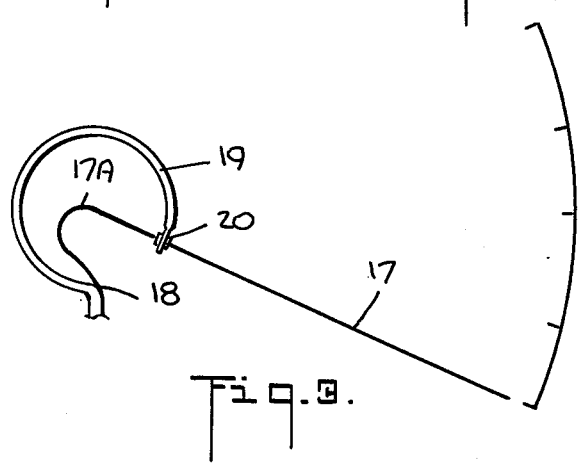

FIG. 3 schematically illustrates a second embodiment of a pressure sensor in accordance with the invention; and FIG. 4 shows, in end view, a third embodiment of a pressure sensor in accordance with the invention.

DESCRIPTION OF INVENTION

Figure 1:
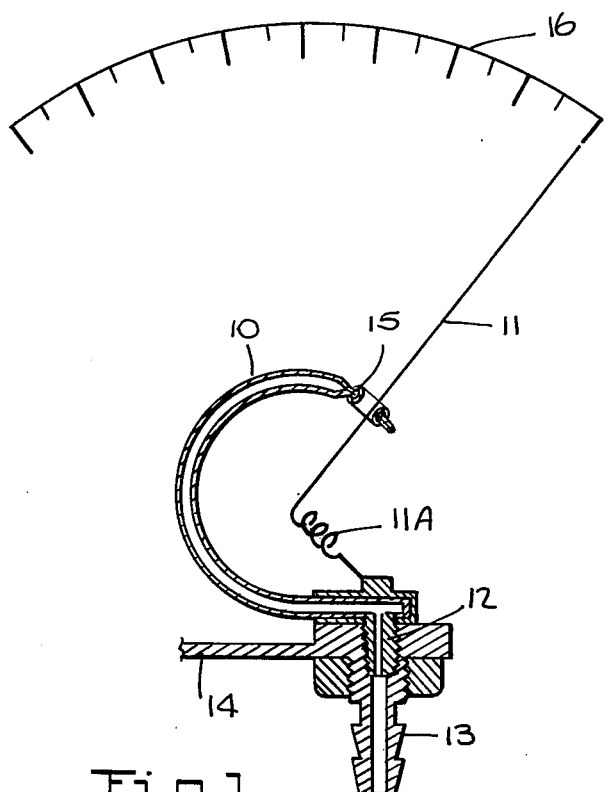
FIG. 1 is a sectional view of a low-pressure sensor in accordance with the invention.

First Embodiment:

Referring now to FIG. 1 there is shown a pressure sensor in accordance with the invention constituted by bladder 10, a spring-wire pointer 11 and a fluid input socket 12. Socket 12 is coupled to a hose connector 13 projecting from the wall 14 of a meter frame whereby the fluid whose pressure is to be measured may be admitted through socket 12 into bladder 10.

Figure 1A:
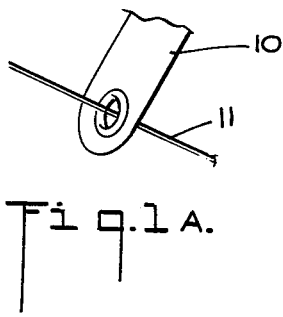
FIG. 1a shows the end section of the bladder included in the sensor.

Bladder 10 is anchored at one end in fluid input socket 12, the internal chamber of the bladder communicating with the fluid input. The closed end of the bladder, as shown separately in FIG. 1a, is provided with an eyelet 15 through which pointer 11 extends. Bladder 10 is preferably constituted by a reinforced elastomeric material so that the cross-sectional area of the bladder is constant and unaffected by pressure. The bladder is normally coiled to assume a C-shaped configuration, fluid pressure applied to the bladder tending to straighten out or uncoil the bladder against the spring tension of pointer 11.

Bladder 10 is fabricated by coating a sleeve formed from woven yarns of Dacron (a polyester fiber made from polyethylene teraphthalate), the sleeve being uniformly coated with silicon rubber. The resultant bladder, while highly flexible is non-dilatable so that the internal surface area of the pressure chamber is unaffected by fluid pressure. The pressure chamber so formed is free of aging and stiffness from −40° C to +200° F and is unaffected by aqueous solutions, salts, mild acids and mild alkalis. Pointer 11 is preferably formed of steel spring wire. One end of the wire is welded or otherwise attached to input socket 12, the wire having a helically coiled section 11A which is disposed within the confines of the bladder, the wire then extending in a straight line through eyelet 15.

When bladder 10 is subjected to fluid under pressure, the bladder seeks to uncoil, this action being resisted by the cantilevered wire spring 11 which initially points to the zero mark on a scale 16. As a consequence, the wire spring is deflected by the uncoiling action of the bladder to an extent determined by applied pressure.

Eyelet 15 functions as a bearing for wire pointer 11, and unless the sliding contact therebetween is relatively friction-free, a slight sticking may be encountered at low pressure. This can be overcome by using polished carbide bushings for the eyelet or sapphire, graphite or stellite bushings in conjunction with a chrome-plated wire pointer. One may also apply a solid low-friction coating to the pointer such as Teflon.

In contradistinction, a standard Bourdon tube pressure gauge, though simple in appearance is a highly complex spring, and when internal pressure is applied, this causes the flat faces of the tube to bulge, giving rise to a high stress concentration at the two edge radii which join the flat faces of the tube. These two edge radii in a Bourdon tube are highly critical, whereas the equivalent radii in an elastomeric bladder in accordance with the invention are not at all critical.

Indeed, a sensor of a given size in accordance with the invention is characterized by tip-travel which is many times greater than that of a Bourdon tube gauge of the same size, so that motion amplification by a linkage or a geared movement is unnecessary. Consequently, the pressure sensor is not subject to the wear, friction and instability during vibration and shock experienced with movements of the type used in conjunction with Bourdon tubes.

Moreover, because of the spring wire-flexible bladder structure of the sensor, it has a life expectancy which is extremely high compared with geared Bourdon or other mechanical pressure gauges of comparable cost.

Figure 2A:
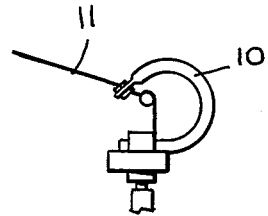
FIG. 2a shows the pointer position of the sensor in the absence of applied pressure.
Figure 2B:
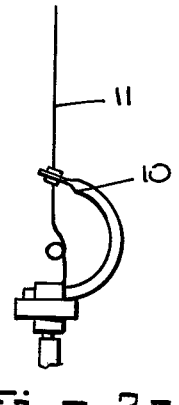
FIG. 2b shows the same sensor with sufficient pressure to cause the sensor pointer to reach the halfway point on the scale.
Figure 2C:
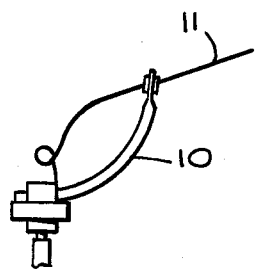
FIG. 2c shows the sensor when the applied pressure results in a full-scale reading.

In operation, the cantilevered wire pointer 11, as shown in FIG. 2A, is at the zero point on the associated scale and the bladder initially assumes a C-form when no pressure is applied. Assuming an operating scale of 0 to 300 mm Hg (a very low pressure scale not heretofore possible with standard Bourdon tube gauges or gauges of the type disclosed in my prior patent), when the applied pressure is 150 mm Hg, which is half-scale, the pointer 11, as shown in FIG 2B, is deflected so that it is straight-up, bladder 10 then being partially uncoiled. And at maximum pressure, pointer 11, as shown in FIG. 2C, is deflected toward the right to point to the high end of the scale.

The diameter of the spring wire sets the calibration range, and since piano-wire is inexpensive and is readily available in virtually any diameter, the gauge may be made in any desired low pressure range by the use of an appropriate piano-wire spring.

Second Embodiment:

In the embodiment shown in FIG. 3, the pointer wire 17 is anchored to the fluid input socket 18, and instead of passing through eyelet 20 at the end of bladder 19, it is soldered thereto so that there is no sliding action therebetween. In this instance, the section of wire 17A between eyelet 20 and socket 18 is formed into a U-shaped spring which lies within the C-shaped bladder but never touches the bladder in the course of operation.

In this embodiment, spring section 17A biases bladder 19, and when fluid pressure is applied to the bladder to uncoil the bladder, this uncoiling motion acts against the tension of the U-shaped spring section to deflect pointer 17 to an extent determined by the fluid pressure and the spring characteristics. Because there is no sliding motion, this embodiment is very low in hysteresis.

Third Embodiment:

As shown in FIG. 4, in this embodiment, use is made of a bladder 21 which is similar to that in FIG. 1 and is anchored on a fluid imput socket 22, the free end of the bladder terminating in an eyelet 23. But instead of a single pointer wire passing through the eyelet, a pair of such wires 24 and 25 is provided to provide a twin pointer which is deflected across the scale as the bladder uncoils in response to an applied pressure.

One end of each wire is welded to input socket 22 and is provided with a helically-coiled section (24A and 25A). The two coil sections are symmetrically disposed within the confines of the bladder, the wires then extending in a straight line through eyelet 23.

To minimize friction between the wires and the eyelet and to prevent sticking of the pointer, the twin wires are surrounded by a sleeve 26 formed of Teflon or similar low friction material. The position of the coil (or coils) relative to the eyelet is an important variable, for when the coil is close to the eyelet, the deflection range is broad (about 130°), whereas when it is removed from the eyelet and close to the input socket, the range of deflection is narrower (about 80° to 90°).

While there have been shown and described preferred embodiments of a low pressure pressure gauge in accordance with the invention, it will be appreciated that many changes and modifications may be made therein without, however, departing from the essential spirit thereof. Thus the wire may be used as one contact of an electrical switch which is caused to close when the pointer engages a fixed contact placed on the scale.

I claim:

1. A fluid-pressure gauge adapted to measure pressure in a range below about 350 mm Hg, said gauge comprising:
   A a fixed fluid input socket mounted on a frame element and coupled to a source of fluid whose pressure is to be metered;
   B a flexible, non-dilatable bladder anchored at one end on said socket and communicating therewith, the other end of said bladder being sealed and being provided with an eyelet, said bladder being fabricated of non-metallic material and normally having a C-shaped formation; and
   C a spring wire anchored at one end on said input socket and extending through said eyelet to form a pointer movable along a scale, the tip of said pointer being at a low end of said scale in the absence of applied fluid pressure, said bladder uncoiling in response to applied pressure to deflect said pointer along said scale to an extent depending on the magnitude of pressure.

2. A gauge as set forth in claim 1, wherein said wire is freely slidable in said eyelet.

3. A gauge as set forth in claim 2, wherein the section of said wire between said eyelet and said fluid input socket is coiled to form a helix which lies within said bladder but out of physical contact therewith.

4. A gauge as set forth in claim 1, wherein said bladder is formed of a fabric-reinforced elastomeric material whose cross-sectional area is constant and unaffected by pressure.

5. A gauge as set forth in claim 3, wherein said fabric is a woven polyester.

6. A gauge as set forth in claim 1, wherein said wire is steel piano wire.

7. A gauge as set forth in claim 1, wherein said wire is attached to said eyelet and the section thereof between said eyelet and said socket has a U-shaped spring formation.

8. A gauge as set forth in claim 2, wherein said pointer wire is surrounded by a sleeve of low-friction material.

9. A gauge as set forth in claim 1, wherein said pointer is constituted by a pair of wires passing through said eyelet and forming a twin pointer.

10. A gauge as set forth in claim 8, wherein the sections of said wires between the eyelet and the socket are coiled to form a pair of symmetrically-disposed helices.

* * * * *